United States Patent [19]

I-Shou

[11] Patent Number: 5,187,643
[45] Date of Patent: Feb. 16, 1993

[54] COMPUTER MOUNTING STRUCTURE FOR A DETACHABLE HARD DISK DRIVE

[76] Inventor: Tsai I-Shou, 13F, No. 409, Sec 4, Jen-Ai Rd., Taipei, Taiwan

[21] Appl. No.: 830,855

[22] Filed: Feb. 4, 1992

[51] Int. Cl.⁵ .................. H05K 7/10; H05K 5/00; H02B 1/36; G06F 1/00
[52] U.S. Cl. .................................. 361/391; 361/380; 361/395; 439/76; 439/928
[58] Field of Search ............... 364/708; 360/97.01, 360/137; 439/76, 377, 928; 361/380, 390, 391, 392, 394, 395, 399

[56] References Cited

U.S. PATENT DOCUMENTS

| | | |
|---|---|---|
| 4,754,397 | 6/1988 | Varaiya et al. .............. 364/708 X |
| 4,937,806 | 6/1990 | Babson et al. ............... 364/708 X |
| 4,941,841 | 7/1990 | Darden et al. .............. 364/708 X |
| 4,977,532 | 12/1990 | Borkowizz et al. .......... 364/708 |
| 5,010,426 | 4/1991 | Krenz ....................... 364/708 X |
| 5,041,924 | 8/1991 | Blackborow et al. ........ 364/708 X |

Primary Examiner—Gerald P. Tolin
Assistant Examiner—Michael W. Phillips
Attorney, Agent, or Firm—Bacon & Thomas

[57] ABSTRACT

In a computer system, a hard disk drive mounting structure is comprised of a mainframe, a sliding box fastened in a chamber inside said mainframe, and a hard disk drive fastened inside said sliding box by screws. The hard disk drive has a PC board inserted in a channel inside the sliding box, which PC board has a connector extending out of the sliding box and connected to a connector on a PC board fastened in the chamber inside the mainframe. The PC board in the chamber inside the mainframe is connected to the mother board of the mainframe by a bus line. The sliding box has two sliding grooves at two opposite sides respectively engaged with two rails in the chamber so that it can be drawn out of the mainframe and then pushed back into place. Retainer blocks are made on the sliding box and engaged in corresponding retaining slots inside the chamber for positioning.

1 Claim, 3 Drawing Sheets

COMPUTER MOUNTING STRUCTURE FOR A DETACHABLE HARD DISK DRIVE

BACKGROUND AND SUMMARY OF THE INVENTION

The present invention relates to a hard disk drive mounting structure for a portable personal computer which permits a hard disk drive to be drawn out of a portable personal computer and then pushed back into place.

The hard disk drive in a computer system is fixedly fastened inside the mainframe thereof when can be removed from place only when the mainframe is detached. The present invention is to design a mounting structure in a computer system for holding a hard disk drive permitting it to be conveniently drawn out of the mainframe thereof and then pushed back into place.

According to the present invention, there is provided a hard disk drive mounting structure for a personal computer, which is generally comprised of a mainframe having a chamber therein, a sliding box fastened in said chamber inside said mainframe, and a hard disk drive fastened inside said sliding box by screws. The sliding box has two sliding grooves at two opposite sides respectively engaged with two rails on the two opposite side walls inside the chamber, and therefore, the sliding box can be conveniently drawn out of the mainframe and then pushed back into place.

DETAILED DESCRIPTION OF THE PREFERRED EMBODIMENT

Figure 1:
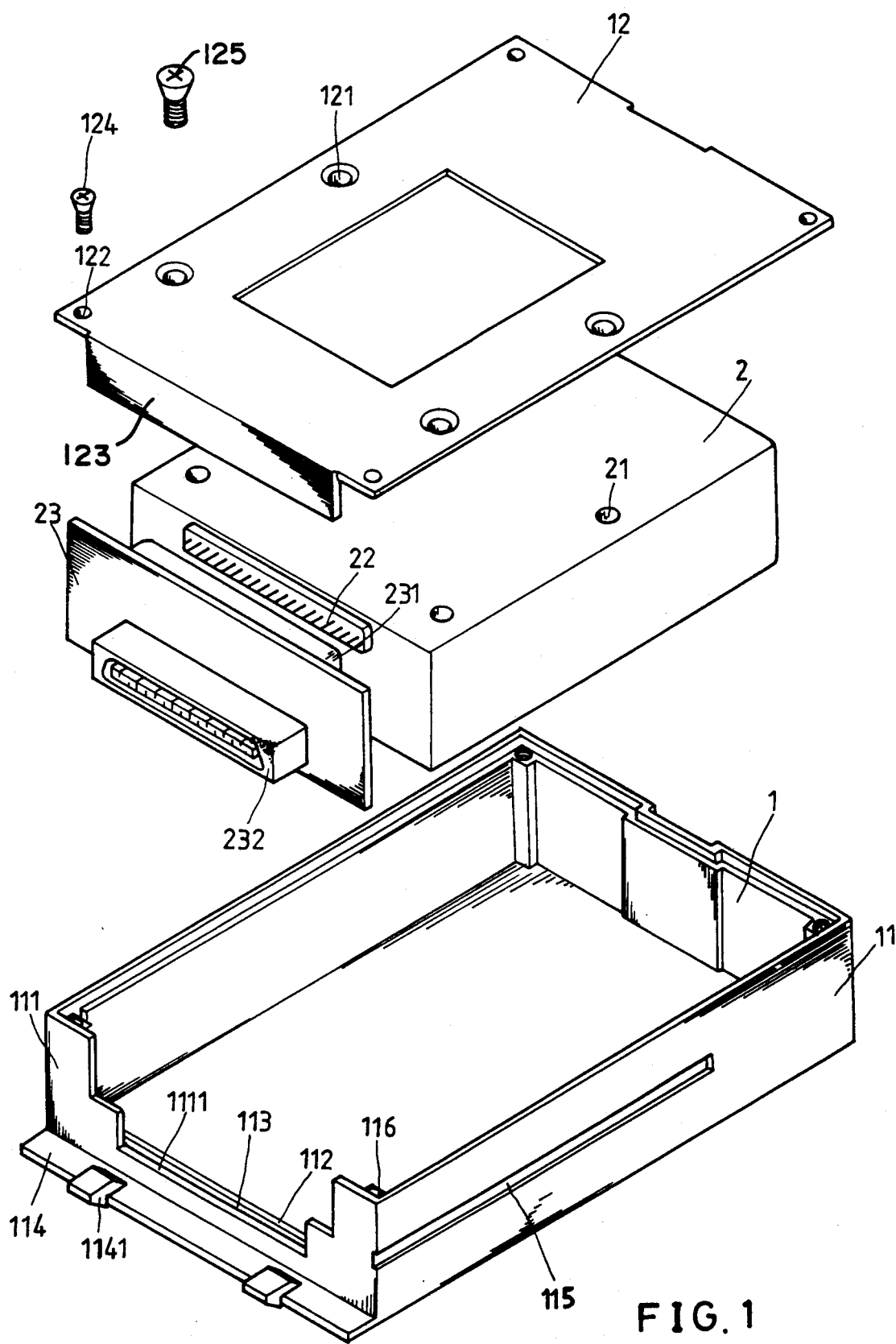
FIG. 1 is an exploded perspective view of a sliding box and a hard disk drive for a portable personal computer as constructed according to the present invention.
Figure 2:
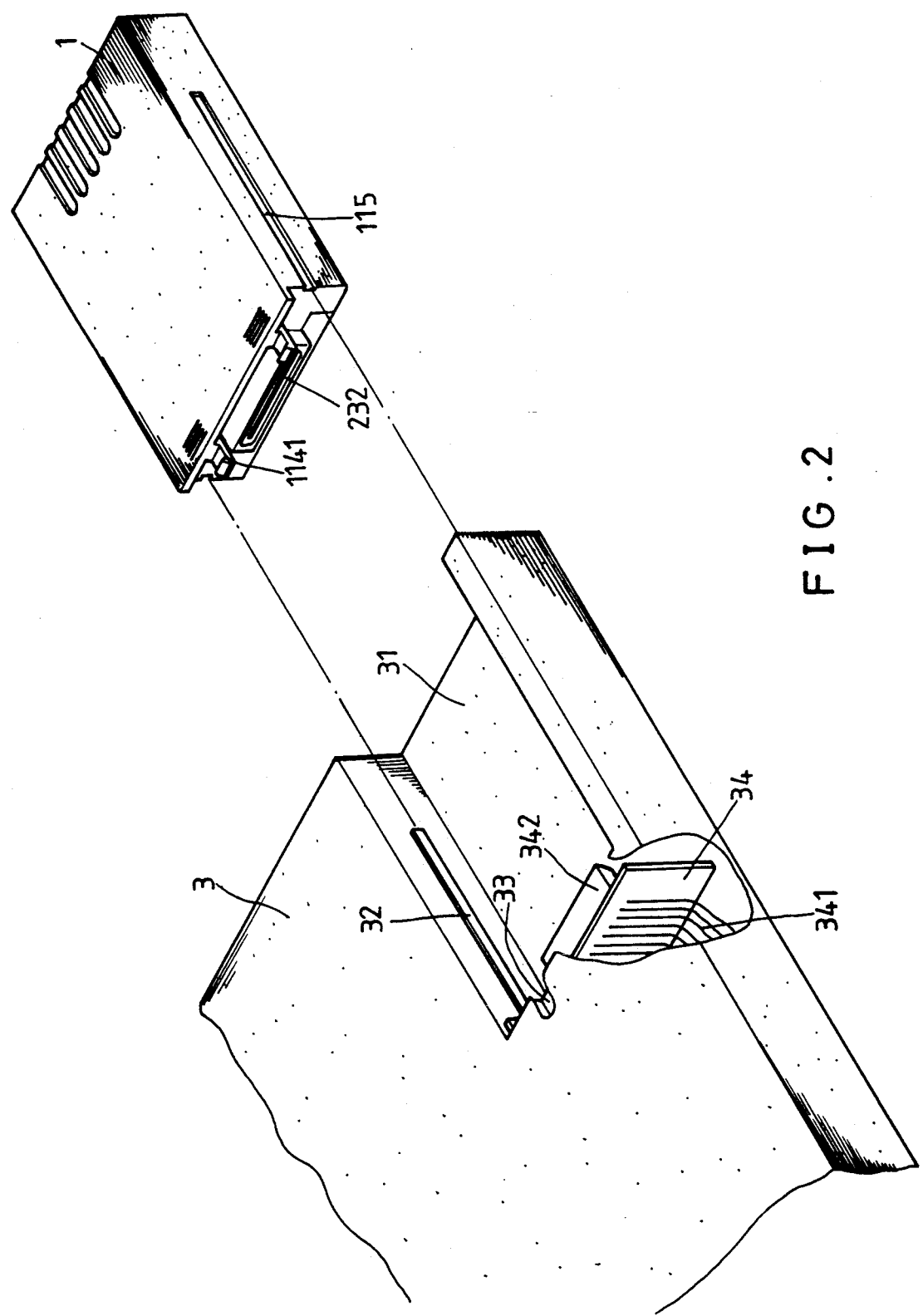
FIG. 2 is a fragmentary view of the present invention showing that the hard disk drive is fastened inside the sliding box for mounting in the mainframe.
Figure 3:
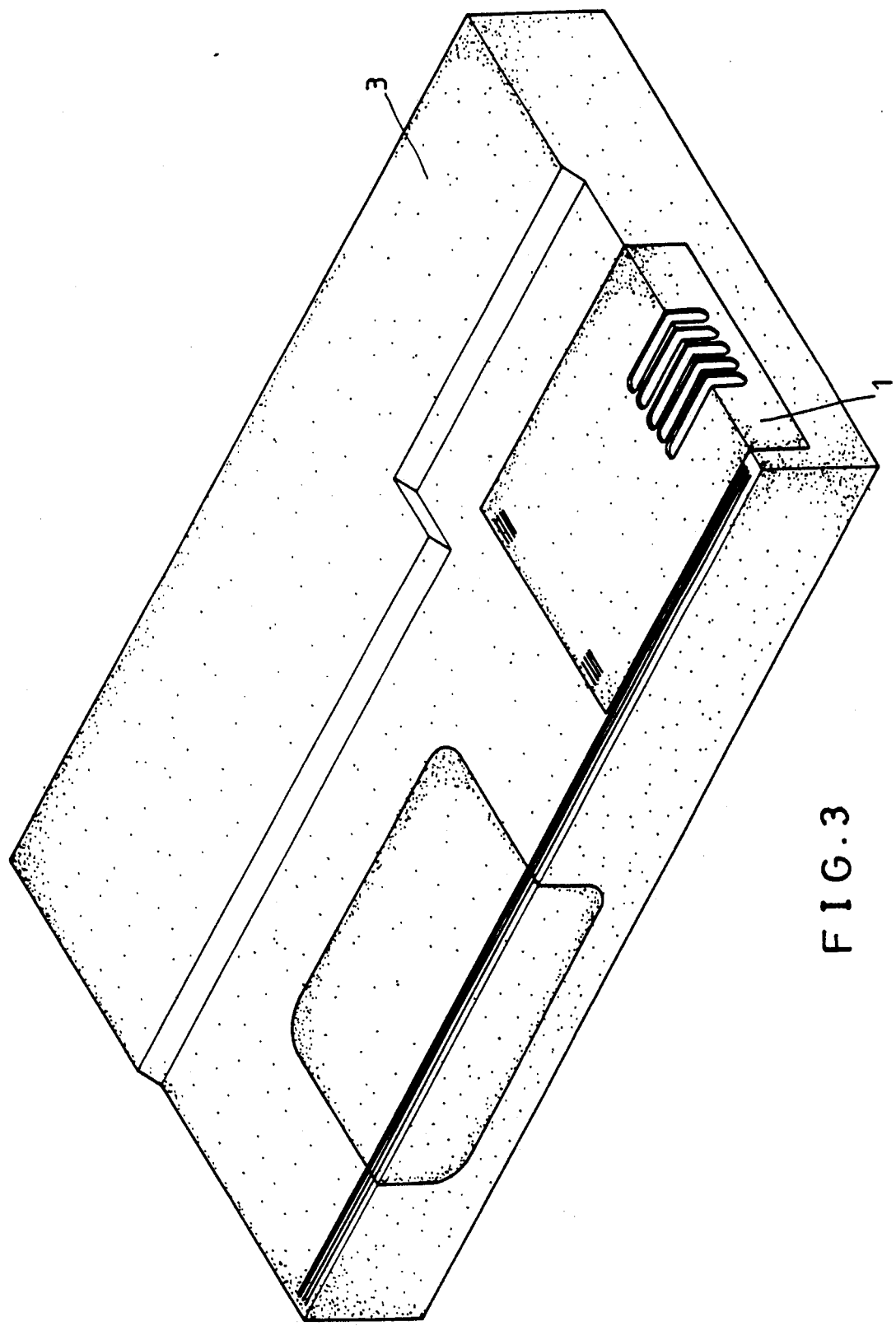
FIG. 3 is a perspective assembly view of the present invention.

Referring to the annexed drawings in detail, therein illustrated is the preferred embodiment of the present invention which is generally comprised of a sliding box 1, a hard disk drive 2 and a computer mainframe 3. The sliding box 1 is made in a rectangular structure and comprised of a casing 11 and a cover 12. The casing 1 has a front panel 111 at the front end thereof which has a stepped opening 1111 at the middle, a guide strip 112 transversely disposed at the inside behind said front panel 111 which defines with said front panel 111 a channel 113 therebetween, a guide board 114 extending outwards from said front panel 111 at the bottom at right angle which has two retainer blocks 114 spaced from each other, two sliding groves 115 longitudinally disposed on the outer wall surface thereof at two opposite sides, and four bolt holes 116 vertically disposed at the inside at the four corners thereof. The cover 12 has a first set of bolt holes 121 on the top edge thereof at suitable locations and a second set of bolt holes 122 at the four corners on the top edge thereof, and a front projecting strip 123 extending downwards from the front end thereof at right angle. The hard disk drive 2 has a plurality of bolt holes 21 on the top edge thereof corresponding to the first set of bolt holes 121 on the cover 12, an input/output port 22 at the front end thereof, a PC board 23 which has a first connector 231 at one end connected to said input/output port 22 and a second connector 232 to connect said first connector 231 to the mother board inside the mainframe 3. The PC board 23 is provided to eliminate from interference of outside static electricity during data transmission between the hard disk drive 2 and the mainframe 3. The mainframe 3 has a chamber 31 at a suitable location for holding the sliding box 1, which chamber 31 comprises two rails 32 disposed in a horizontal position at two opposite sides, two spaced retaining slots 33 at an inner end, and a PC board 34 fixedly fastened at the inside, wherein said PC board 34 has a connector 342 at one end and a bus line 341 at an opposite end to connect to the mother board in the mainframe 3.

The aforesaid parts are connected into position according to the following procedures. The hard disk drive 2 is set inside the casing 11 permitting the PC board 23 to insert in the channel 113, then, the cover 12 is covered on the casing 11 permitting the front projecting strip 123 to engage in the stepped opening 111, and then, insert screws 124 through the bolt holes 121 on the cover 12 into the bolt holes 21 on the hard disk drive 2 and insert screws 125 through the bolt holes 122 on the cover 12 into the bolt holes 116 on the casing 11. Thus, the hard disk drive 2 is firmly secured inside the sliding box 1. Then, engage the two sliding grooves 115 on the sliding box 1 with the two rails 32 in the chamber 31 inside the mainframe 3, permitting the sliding box 1 to be inserted inside the chamber 31. After inserting in the chamber 31, the second connector 232 of the PC board 23 of the hard disk drive 2 is connected to the connector 342 of the PC board 34 of the mainframe 3 and, the retaining blocks 1141 of the guide board 114 of the casing 1 are respectively engaged in the retaining slots 33 in the mainframe 3. Thus, the sliding box 1 is secured in position inside the mainframe 3. When the connectors 342 and 232 are disconnected from each other and the retainer blocks 1141 are disconnected from the retaining slots 33, the sliding box 1 can be conveniently drawn out of the mainframe 3 by moving the sliding grooves 115 outwards along the rails 32.

What is claimed is:

1. A hard disk drive mounting structure, the improvement comprising:

a sliding box comprised of a casing and a cover, said casing including a front panel, said front panel having a stepped opening disposed thereon, a guide strip at the inside defining with said front panel a channel therebetween, a guide board extending outwards from said front panel at the bottom at right angle, said guide board having two retainer blocks spaced from each other, two sliding grooves longitudinally disposed on the outer wall surface thereof at two opposite sides, and four bolt holes vertically disposed at the inside at the four corners thereof, said cover having a first set of bolt holes on the top edge thereof and a second set of bolt holes at the four corners on the top edge thereof respectively connected to the bolt holes on said casing by screws, and a front projecting strip extending downwards from the front end thereof at a right angle and engaged in said stepped opening;

a hard disk drive fastened inside said sliding box, said hard disk drive having a plurality of bolt holes on the top edge respectively connected to said first set of bolt holes on said cover by screws, an input/output port at the front end thereof, a PC board fastened in said channel and having a first connector at one end connected to said input/output port and a second connector at an opposite end;

a mainframe having chamber at a suitable location for holding said sliding box, said chamber comprising two rails at two opposite sides, two spaced retaining slots at an inner end, and a PC board fixedly fastened at the inside and having a connector at one end and a bus line at an opposite end for connection to a mother board inside said mainframe; and wherein said two sliding grooves on said sliding box are respectively engaged with said two rails in said chamber with the second connector of the PC board of said hard disk drive connected to the connector of the PC board in said chamber and, with said retaining blocks of said guide board of said casing respectively engaged in said retaining slots inside said chamber permitting said hard disk drive to be held inside said mainframe by said sliding box and for electrical connection to a mother board in said mainframe.

* * * * *